(12) United States Patent
Kim

(10) Patent No.: US 10,575,477 B2
(45) Date of Patent: Mar. 3, 2020

(54) PLANT POT AND PLANT POT INSERT

(71) Applicant: Samuel Kyun Kim, Fullerton, CA (US)

(72) Inventor: Samuel Kyun Kim, Fullerton, CA (US)

(*) Notice: Subject to any disclaimer, the term of this patent is extended or adjusted under 35 U.S.C. 154(b) by 289 days.

(21) Appl. No.: 15/597,023

(22) Filed: May 16, 2017

(65) Prior Publication Data

US 2018/0332775 A1    Nov. 22, 2018

(51) Int. Cl.
*A01G 27/02* (2006.01)
*A01G 27/00* (2006.01)

(52) U.S. Cl.
CPC ........... *A01G 27/02* (2013.01); *A01G 27/008* (2013.01)

(58) Field of Classification Search
CPC ...... A01G 27/02; A01G 27/008; A01G 27/06; A01G 9/029; A01G 9/00
See application file for complete search history.

(56) References Cited

U.S. PATENT DOCUMENTS

| | | | | |
|---|---|---|---|---|
| 3,903,644 A * | 9/1975 | Swift | ...................... | A01G 27/02 47/79 |
| 4,001,967 A * | 1/1977 | Swift | ...................... | A01G 27/02 47/80 |
| 6,691,460 B1 * | 2/2004 | Lee | ........................ | A01G 27/02 47/79 |
| 6,862,843 B2 * | 3/2005 | Missry | ............... | A01G 13/0212 47/65.5 |
| 6,880,484 B1 * | 4/2005 | Lee | ........................ | A01G 27/02 119/74 |
| 7,171,783 B1 * | 2/2007 | Fidotti | ................... | A01G 27/04 47/81 |
| 8,621,783 B2 * | 1/2014 | Tsai | ....................... | A01G 27/02 47/48.5 |
| 9,439,370 B2 * | 9/2016 | Donnelly | ............... | A01G 27/06 |
| 2009/0056219 A1 * | 3/2009 | Csoke | .................... | A01G 27/02 47/79 |
| 2010/0139160 A1 * | 6/2010 | Hirsh | ................... | A01G 25/167 47/66.6 |
| 2013/0291435 A1 * | 11/2013 | Gettig | .................... | A01G 27/02 47/79 |
| 2015/0135591 A1 * | 5/2015 | Contillo | ............... | A01G 27/008 47/81 |

(Continued)

FOREIGN PATENT DOCUMENTS

DE        3842686 A1 *   6/1990   ............. A01G 27/02
DE   102013112980 B4 *   2/2017   ............. A01G 31/02

OTHER PUBLICATIONS

EPIC Green Solutions, EPIC Chamber, Feb. 6, 2012, http://epic-green.com/products_epic-chamber.html, retrieved on May 15, 2017.

(Continued)

*Primary Examiner* — Joshua D Huson

(74) *Attorney, Agent, or Firm* — Heedong Chae; Lucem, PC

(57) ABSTRACT

A plant pot or a plant pot insert includes a water filling chamber having a fill opening to receive water, a water outlet to provide water to a water reservoir, and an overflow conduit to discharge excess water through a weep hole on a sidewall of the plant pot. The water reservoir provides water to a root system of a plant to be grown in the plant pot by capillary action. A water level sensing unit detects a water level of the water reservoir.

10 Claims, 11 Drawing Sheets

(56) References Cited

U.S. PATENT DOCUMENTS

2016/0066522 A1\* 3/2016 Walker, II ............. A01G 27/02
                                                            47/81
2016/0135392 A1\* 5/2016 Stewart, Jr. ........... A01G 27/04

OTHER PUBLICATIONS

R.L. Salim, Extent of Capillary Rise in Sands and Silts, Master's Theses, Apr. 2016, Paper 688, http://scholarworks.wmich.edu/masters_theses/688, retrieved on May 15, 2017.

\* cited by examiner

PLANT POT AND PLANT POT INSERT

FIELD OF THE INVENTION

The present invention relates to a plant pot and a plant pot insert and, more particularly, to a plant pot and a plant pot insert for growing plants by capillary action.

BACKGROUND OF THE INVENTION

Growing plants in plant pots provide an alternative to growing plants directly in the ground and may be used, for example, as decor or to grow fruits and vegetables for food. Plants that are grown in homes, gardens, or nurseries are often planted in plant pots, which are filled with soil and require watering at regular intervals. Plants utilize capillary action to draw water absorbed by soil through their roots. Without regular watering of plant pots, the soil becomes dry and plants grown therein may become dehydrated and die.

Generally, plant pot plants may be watered by pouring or spraying water on the plant or the soil in the plant pot. For example, plants may be watered by hand by using a watering can or a garden hose. However, watering plants can be time consuming and laborious. If plant watering is neglected, the plant may become dehydrated and die. On the other hand, plant pots can be overwatered, which may also kill the plants grown therein.

Regular watering may also be accomplished by a number of automated watering systems. For example, drip irrigation systems may be installed to connect a plant pot to a water source. However, such watering systems may be expensive and time consuming to install or otherwise impractical to implement. Additionally, such watering systems may be unattractive and distract from the aesthetics of the plant and plant pot.

A conventional plant pot is constructed with a drainage hole at a bottom of the pot to handle oversaturation of water. However, constant weeping from such pots may lead to unwanted staining on the ground or floor. Additionally, a novice horticulturist may not know how much water a plant needs and find it difficult to accurately determine the amount of water in a conventional plant pot until it has dried out or the plant has been overwatered.

Thus, there is a need for a plant pot or an insert for a plant pot that can reduce the labor and time required by regular plant watering. Furthermore, such a plant pot or insert for a plant pot needs to be easy to set up and use without being messy.

SUMMARY OF THE INVENTION

The present invention contrives to solve the problems of the prior art. The present invention provides a plant pot or a plant pot insert to be received in a plant pot for plant watering by capillary action. The plant pot or plant pot insert may include a water filling chamber having a fill opening to receive water and a water outlet to fill a water reservoir of the plant pot. Additionally, the plant pot or plant pot insert of the present invention may include an overflow conduit or spout connected to a weep hole of the plant pot to allow drainage of excess water.

A water permeable separator may be provided with the plant pot or the plant pot insert and be disposed between the water outlet of the water filling chamber and the water reservoir of the plant pot. The water reservoir may form a lower portion of a planting space of the plant pot and be substantially filled with gravel. The gravel shape and size may provide space between the gravel to be filled by water. An upper portion of the planting space may be substantially filled with soil, which may support a root system of a plant. The water permeable separator may allow the flow of water from the water filling chamber to the planting space and prevent the passage of gravel and soil into the water filling chamber.

When the water filling chamber of the plant pot or the plant pot insert is filled with water, water may initially flow by gravity flow to the water reservoir. When a water filling capacity of the water reservoir has been reached, water may then flow from the water filling chamber to the overflow conduit or spout and be drained from the plant pot through the weep hole.

The plant pot or the plant pot insert may further include a water level sensor to detect a water level of the water reservoir. Such a water level sensor may be electrically connected to a notification light to alert the user that the water reservoir has been filled to capacity. Alternatively, the water level sensor may alert the user that the water reservoir requires filling with water. In some embodiments the water level sensor may be electrically connected to a switch for a water source to automatically fill the water reservoir when low or empty and to stop flow from a water flow when the water reservoir has been filled to capacity.

Some of the advantages of the present invention are: the plant pot or the plant pot insert of the present invention allows the plant to be watered less frequently, saving the user time and labor; by having an overflow conduit or spout, the water level of the water reservoir of the plant pot may be effectively controlled, which essentially eliminates the possibility that the plant will be damaged or killed by overwatering; the water level of the reservoir may be visible through the weep hole such that the user can easily determine when a plant requires more water; because excess water is drained through a weep hole formed on a side of the plant pot, staining or messiness due to water seeping through bottom drainage holes of the plant pot is not a concern; and the structure of the plant pot or the plant pot insert may provide obscured fill openings such that the plant pot of the present invention or a plant pot with the plant pot insert received therein may have an aesthetically pleasing appearance appropriate for use as decor or the like.

Although the present invention is briefly summarized, a fuller understanding of the invention can be obtained by the following drawings, detailed description and appended claims.

BRIEF DESCRIPTION OF THE DRAWINGS

These and other features, aspects, and advantages of the present invention will become better understood with reference to the accompanying drawings, wherein.

DETAILED DESCRIPTION OF THE EMBODIMENTS OF THE INVENTION

Figure 1:
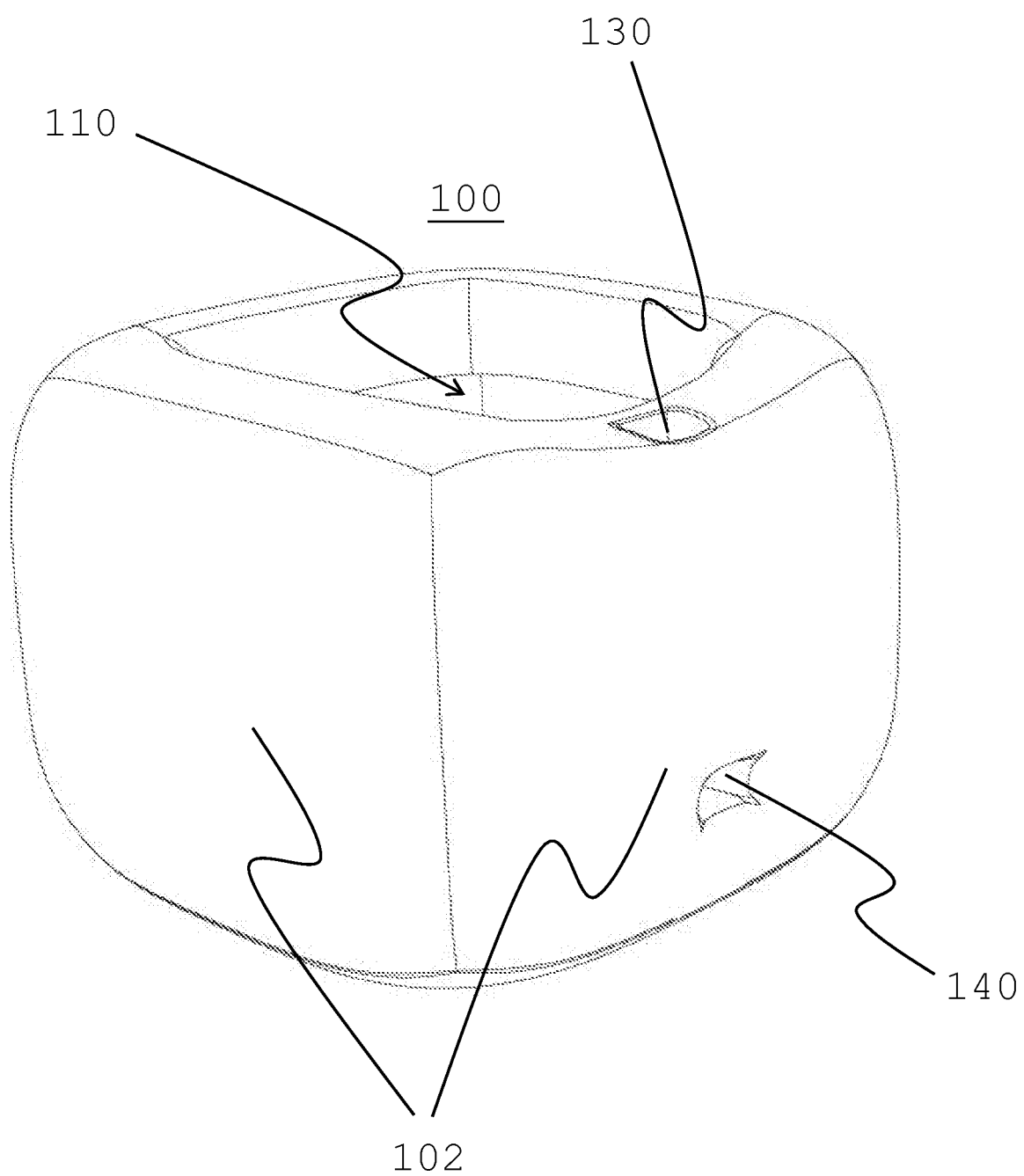
FIG. 1 shows a perspective view of a plant pot for growing plants according one embodiment of the present invention.
Figure 2:
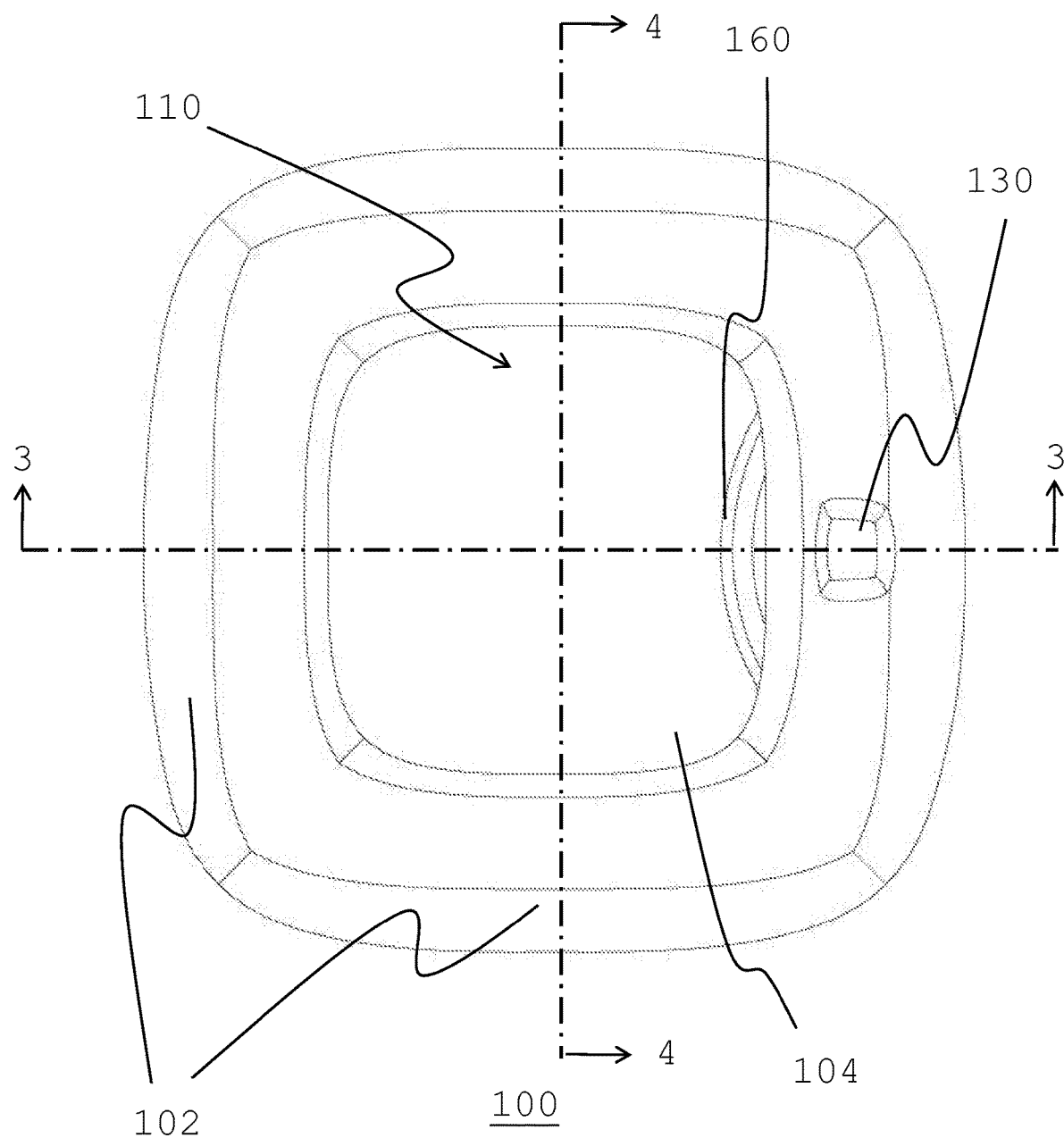
FIG. 2 shows a top plan view thereof.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations by use of the word "about", it will be understood that the particular value forms another embodiment.

Shown in FIGS. 1-5 is a plant pot 100 for growing plants according to one embodiment of the present invention. The plant pot 100 may include sidewalls forming sides of the plant pot 100; a pot bottom 104, wherein the sidewalls 102 are formed along edges of the pot bottom; a planting space 110, wherein a lower portion of the planting space 110 comprises a water reservoir 112; a water filling chamber 120 having a fill opening 130 to receive water and a water outlet 135 formed below the fill opening; a water permeable separator 160 disposed between the water outlet 135 and the planting space 110 to facilitate gravity flow of water between the water filling compartment 120 and the planting space 110, a weep hole 140 formed in one of the sidewalls 102 of the plant pot 100; and an overflow conduit 150 extending from the weep hole 140 to the water filling chamber 120. Water may flow from the water filling chamber 120 to the planting space 110 when a water level of the water reservoir 112 is below the weep hole 140. Water may flow from the water filling chamber 120 to an exterior of the plant pot 100 via the overflow conduit 150 when the water level of the water reservoir 112 is at the same level as or above the weep hole 140.

Figure 3:
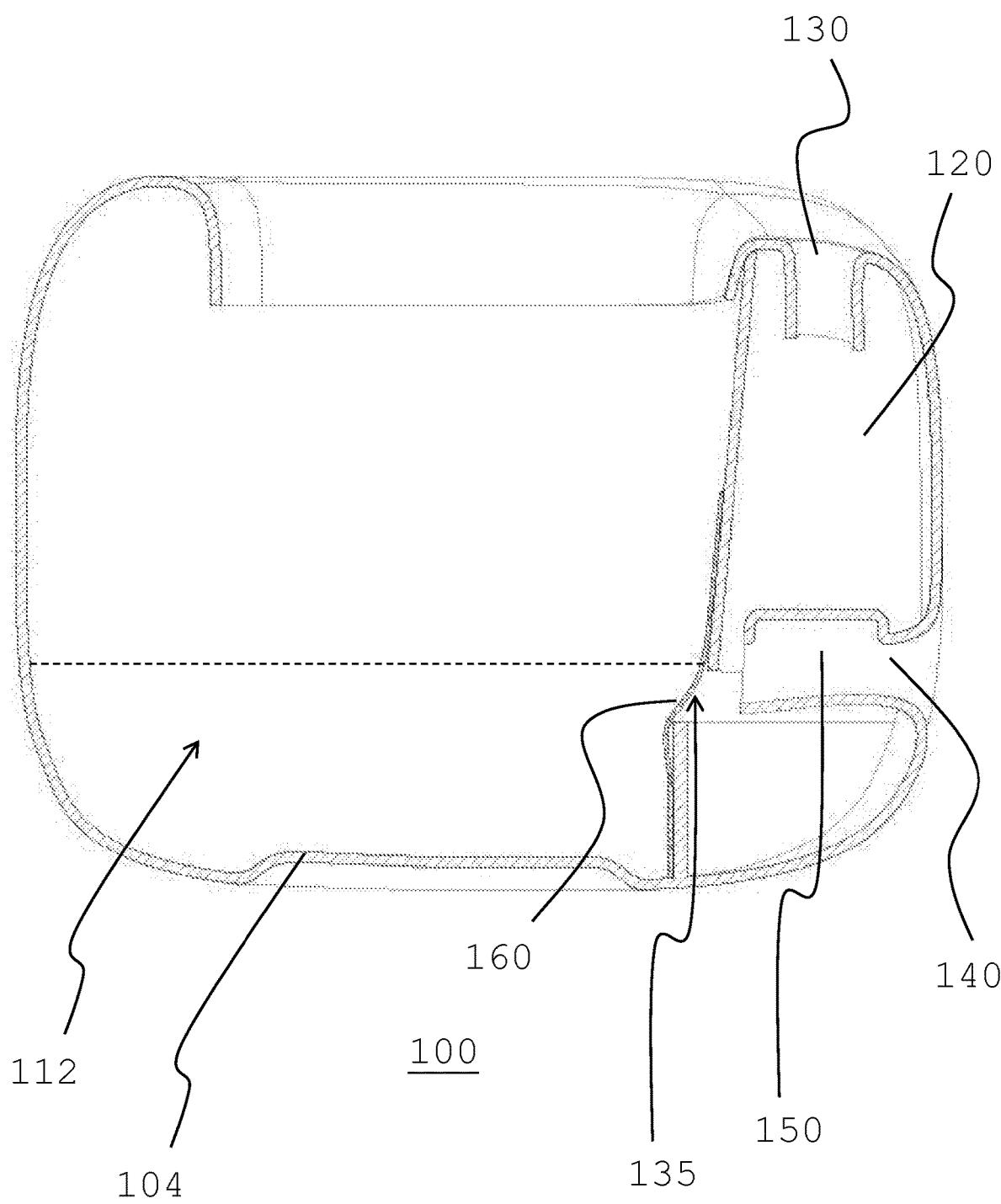
FIG. 3 shows a cross-sectional view of the plant pot along line 3-3 of FIG. 2.
Figure 4:
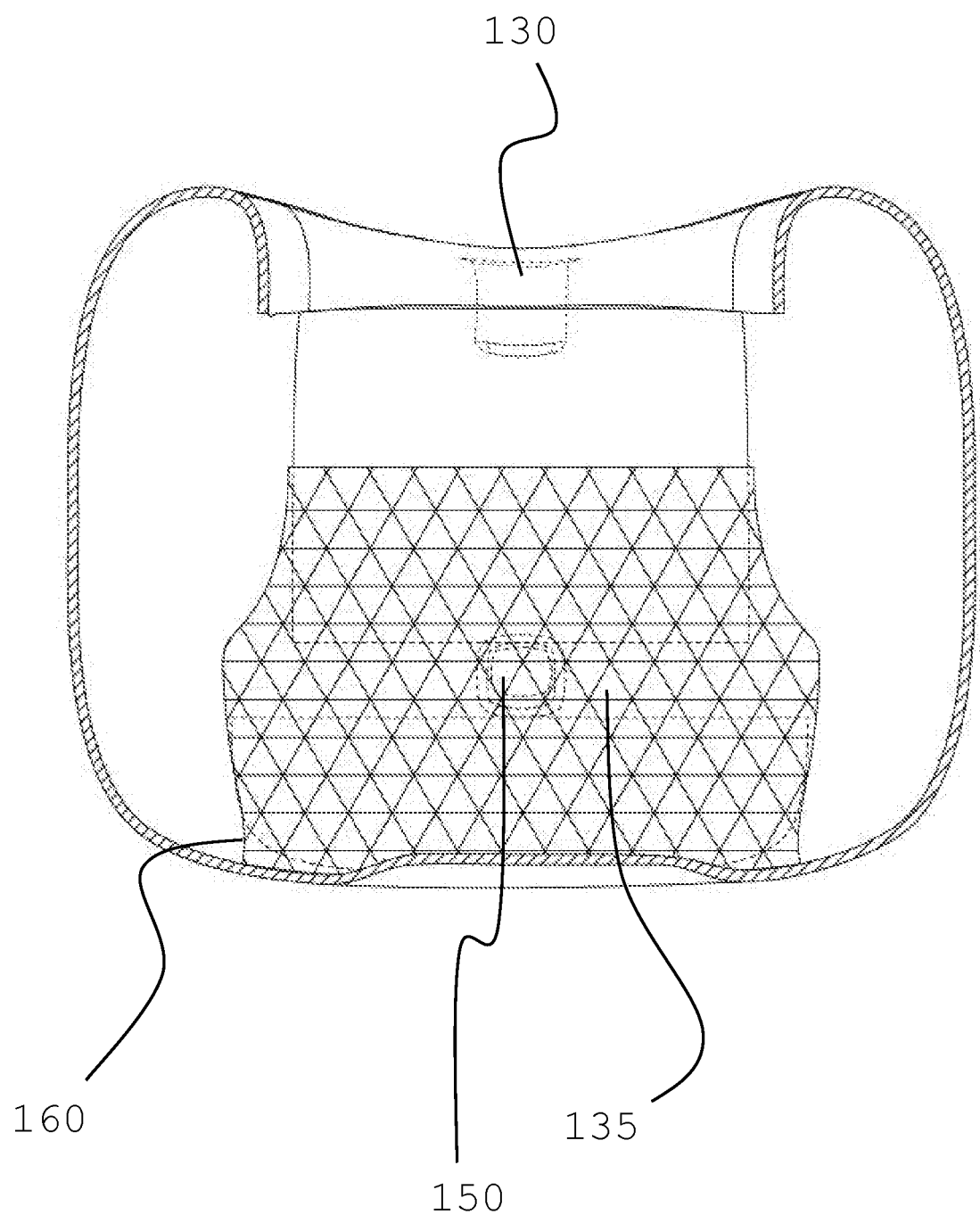
FIG. 4 shows a cross-sectional view of the plant pot along line 4-4 of FIG. 2.

The overflow conduit 150 may be disposed above the water outlet 135, as shown in FIGS. 3 and 4. Herein, the overflow conduit 150 may also be a channel, duct, pipe, or tube appropriate for passage of water.

As shown in the cross-sectional view of FIG. 3, the overflow conduit 150 of the plant pot 100 may be upwardly slanted towards the weep hole 140. Herein, the overflow conduit 150 may be entirely upwardly slanted towards the weep hole 140 or partially upwardly slanted toward the weep hole 140.

The water permeable separator 160 may be made of a fabric. Preferably, the water permeable separator 160 may be made of landscape fabric. However, the water permeable separator 160 may be some other fabric or material suitable to allow flow of water and to block passage of soil and gravel. In the cross-sectional view of FIG. 4, the water permeable separator 160 is depicted by a triangular pattern. The water permeable separator 160 may be fixedly attached to an outer surface of a wall of the water filling chamber 120.

Figure 5:
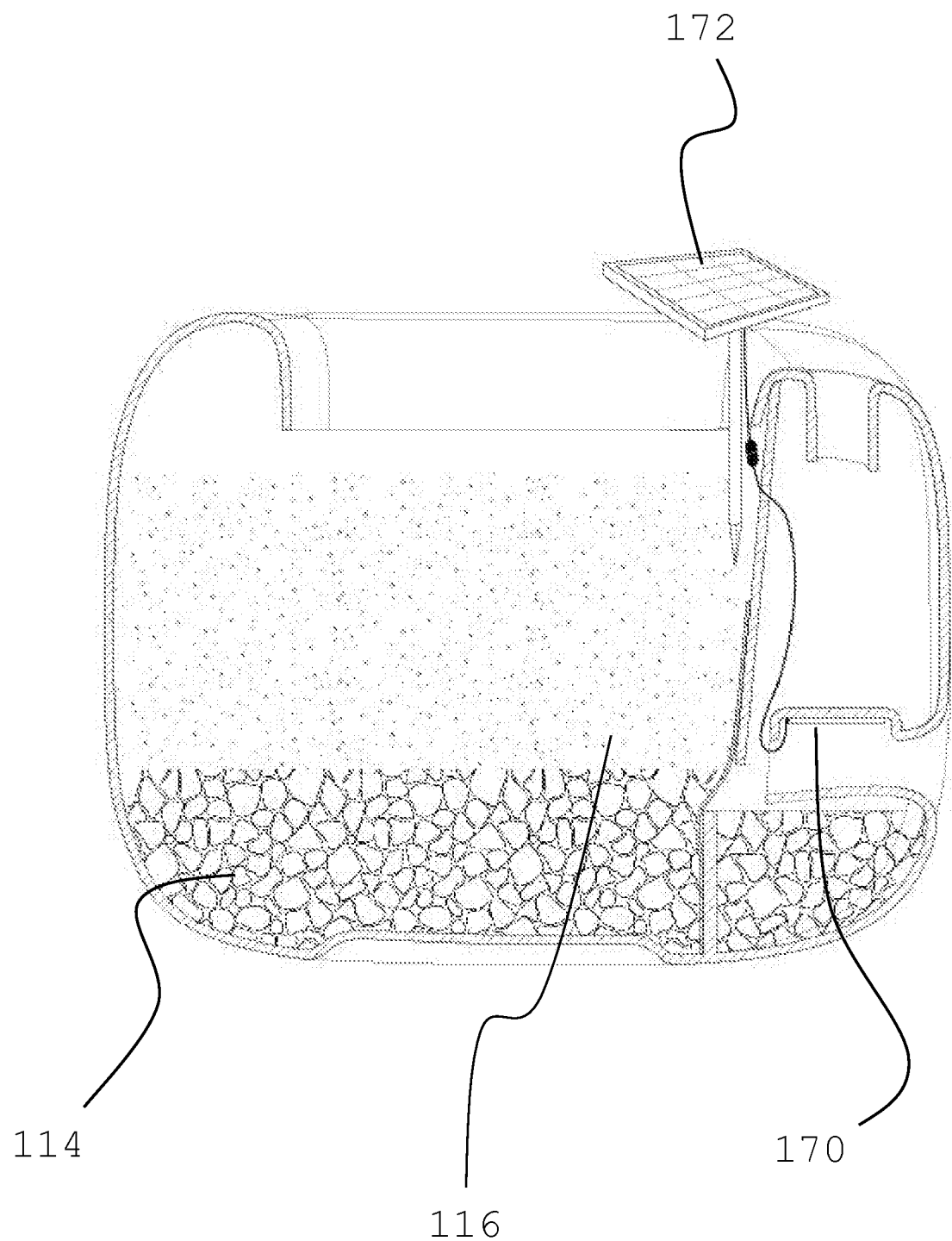
FIG. 5 shows another cross-sectional view of the plant pot along line 3-3 of FIG. 2.

As illustrated in FIG. 5, the water reservoir 112 is substantially filled with gravel 114. Any size, shape, and type of gravel may be used as gravel 114. The choice of gravel 114 may affect the effective porosity of the water reservoir 112 and hence determine the water capacity of the water reservoir 112. The gravel 114 may be crushed stone, pea gravel, or a combination of crushed stone and pea gravel. The gravel 114 may have an average size of ¼ of an inch to 1 inch. Preferably, the gravel may have an average size of ¾ of an inch.

As shown in FIG. 5, the planting space 110 above the water reservoir 112 may be substantially filled with soil 116. Soil may describe any medium or matrix suitable for supporting capillary action watering of a root system of a plant. Preferably, the soil 116 may include sandy loam; however, another sand, silt, or clay of varying grain sizes may be used. The choice of soil may vary depending on the plant to be grown in the plant pot 100. The choice of soil may affect the water retention capacity of the soil as well as the rate and limit of capillary action of water through the soil. The user of the plant pot 100 may choose the soil 116 to be used according to the optimized needs of the plant to be grown.

As shown in FIG. 5, the plant pot 100 may further include a light source 170 installed above the overflow conduit 150, wherein the light source 170 illuminates a water level in the overflow conduit 150 to be visible through the weep hole 140. Preferably the light source 170 may be a light emitting diode (LED) or a plurality of LEDs. Preferably, the light source, 170 may be an LED strip light.

The plant pot 100 may include a solar panel 172, as shown in FIG. 5. The light source 170 may be electrically connected to a solar panel 172. The solar panel 172 may include a stake and the stake may be inserted in the soil 116 of the plant pot 100 as illustrated in FIG. 5. However, the solar panel 172 may not necessarily be inserted in the soil; for example, the solar panel 172 may be disposed on an outer surface of a sidewall 102 of the plant pot 100. The solar panel 172 may provide power to the light source 170. The light source 170 may also be powered by a battery. In an another alternative embodiment, the light source 170 may be powered by plugging a power cord electrically connected to the light source 170 into an electrical outlet, such as a wall outlet.

Figure 6:
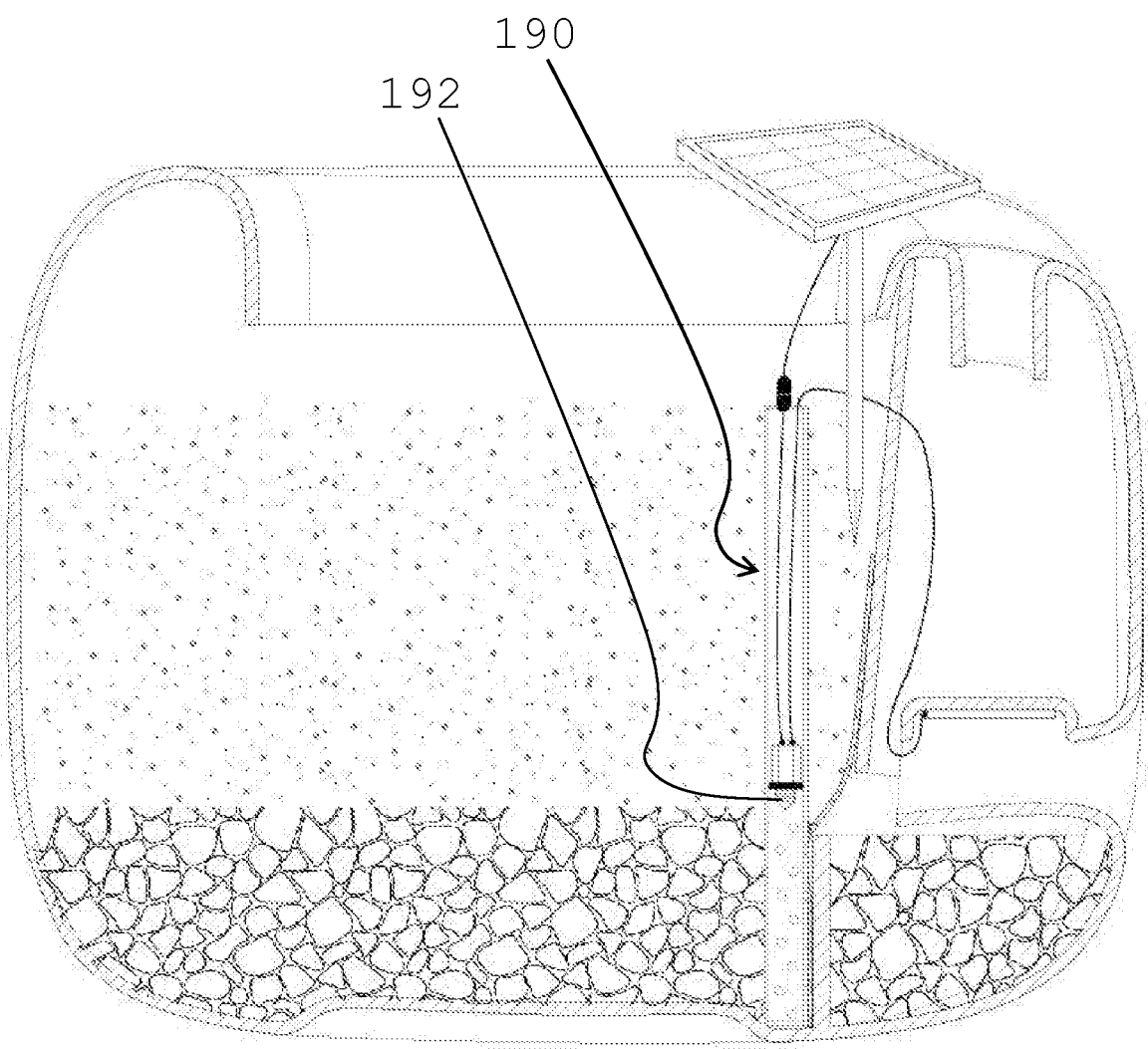
FIG. 6 shows another cross-sectional view of the plant pot including a water level sensing unit.

FIG. 6 shows a cross-sectional view of another embodiment of the plant pot 100 including a water level sensing unit 190 to detect a water level of the water reservoir 112. As shown in FIG. 6, the water level sensing unit 190 may include a tube and a water sensor 192 disposed inside of the tube. The water sensor 192 may be vertically disposed at about the same or slightly below a vertical position of the weep hole 140. The water level sensing unit 190 may be electrically connected to a light source 170 and a solar panel 172. When the water level reaches a height of the water sensor 192, the user may be alerted that the water reservoir 112 has been filled to capacity. For example, water reaching the water sensor 192 may activate a switch to turn off the light source. Alternatively, water reaching the water sensor 192 may activate a switch to turn on the light source. The water sensor 192 may be connected to other forms of alerting the user such as a sound alarm or a display.

Alternatively, a water sensor 192 may be vertically disposed substantially below the vertical position of the weep hole 140 to detect when the water reservoir is empty. In such an embodiment, the user would be reminded to fill the water reservoir 112.

In yet another embodiment, the water sensing unit 190 may include two water sensors 192. One water sensor may detect when a water level of the water reservoir 112 is low or empty and the other water sensor may detect when the water reservoir 112 is filled to capacity.

The plant pot 100 may be connected to a water source. When the water sensing unit 190 detects that a water level of the water reservoir 112 is low or empty, a switch may be triggered to allow flow of water into the water filling chamber 120. When the water sensing unit 190 detects that a water level of the water reservoir 112 has reached capacity, the flow of water may be blocked.

Figure 7:
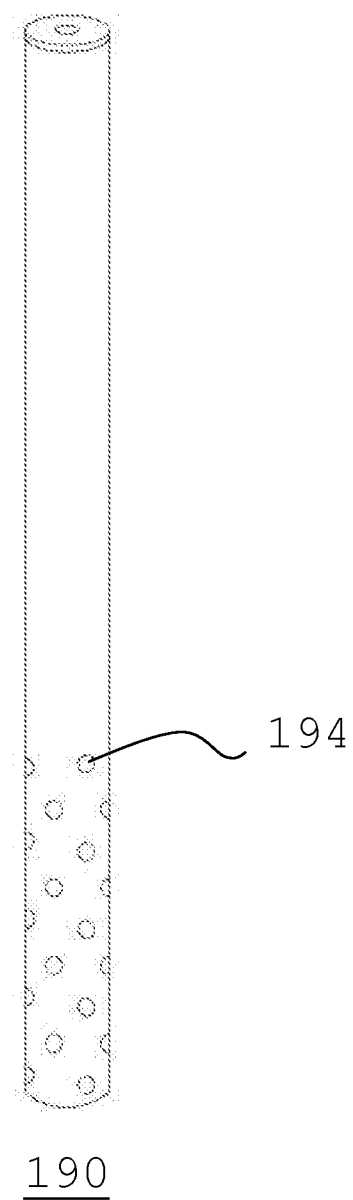
FIG. 7 shows a water level sensing unit by itself.
Figure 8:
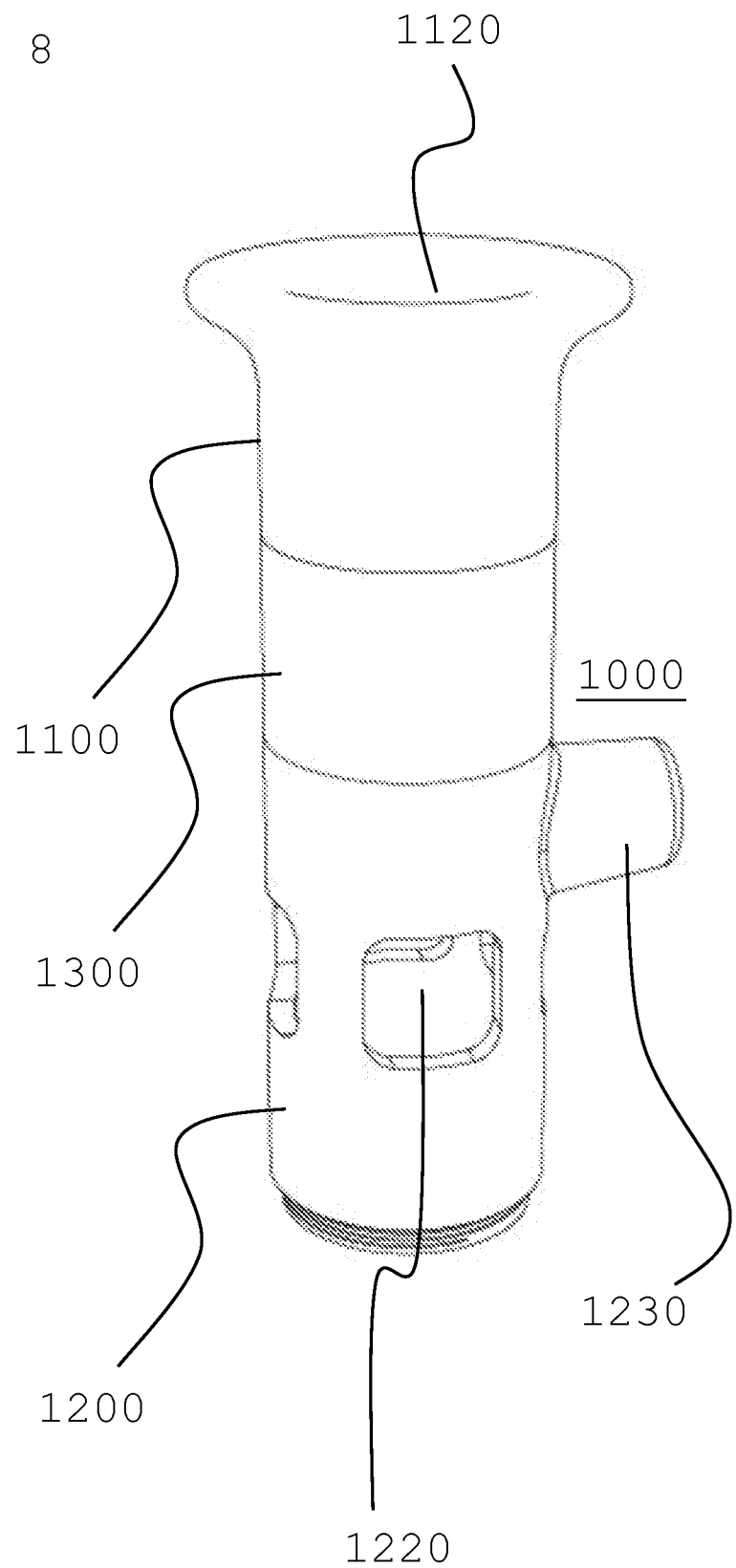
FIG. 8 shows a perspective view of a plant pot insert with the water permeable separator removed for clarity of view according to another embodiment of the present invention.

FIG. 7 illustrates a water sensing unit 190 by itself. The tube of the water sensing unit may include a lower portion having a plurality of perforations 194. The perforations 194 may be sized to be smaller than the gravel 114 of the water reservoir 112.

The plant pot 100 may be made of any durable material conventionally used for a plant pot. Preferably, the sidewalls 102 may be made of fiberglass, glass fiber reinforced concrete, concrete, or combination of these materials. Fiberglass may be preferred for forming the sidewalls due to its strength, weight, appearance, and versatility of manufacturing.

Shown in FIG. 8-11 is a plant pot insert 1000 for growing plants according to another embodiment of the present invention. The plant pot insert 1000 for providing water to plants grown in a plant pot 2000 having a weep hole 2140 comprising: a water filling chamber 1110 with a fill opening 1120 to receive water and a water outlet 1220 to discharge water to a water reservoir 2112 of a plant pot 2000; an overflow spout 1230 fixedly connected to the water filling chamber 1110 and disposed above the water outlet 1220; and a water permeable separator 1600 substantially covering the water outlet 1220 and disposed between the water outlet 1220 and the water reservoir 2112 of the pot 2000 to facilitate gravity flow of water between the water filling chamber 1110 and the water reservoir 2112. The plant pot insert 1000 may be constructed to be received in the plant pot 2000. The overflow spout 1230 may be constructed to be connected to the weep hole 2140. In a similar function of the overflow conduit 150 of the plant pot 100, excess water in the plant pot 2000 may flow through the overflow spout 1230 and out of the weep hole 2140.

Figure 9:
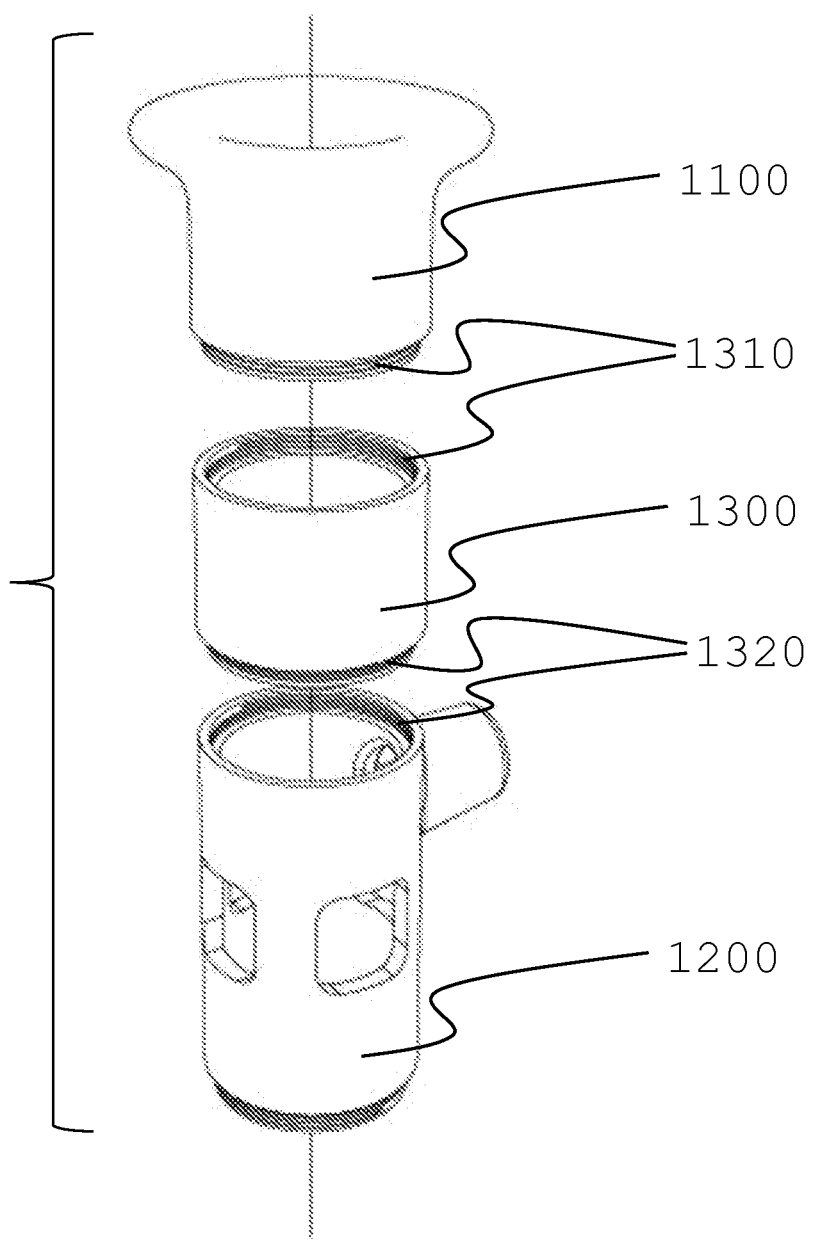
FIG. 9 shows an exploded view thereof.
Figure 11:
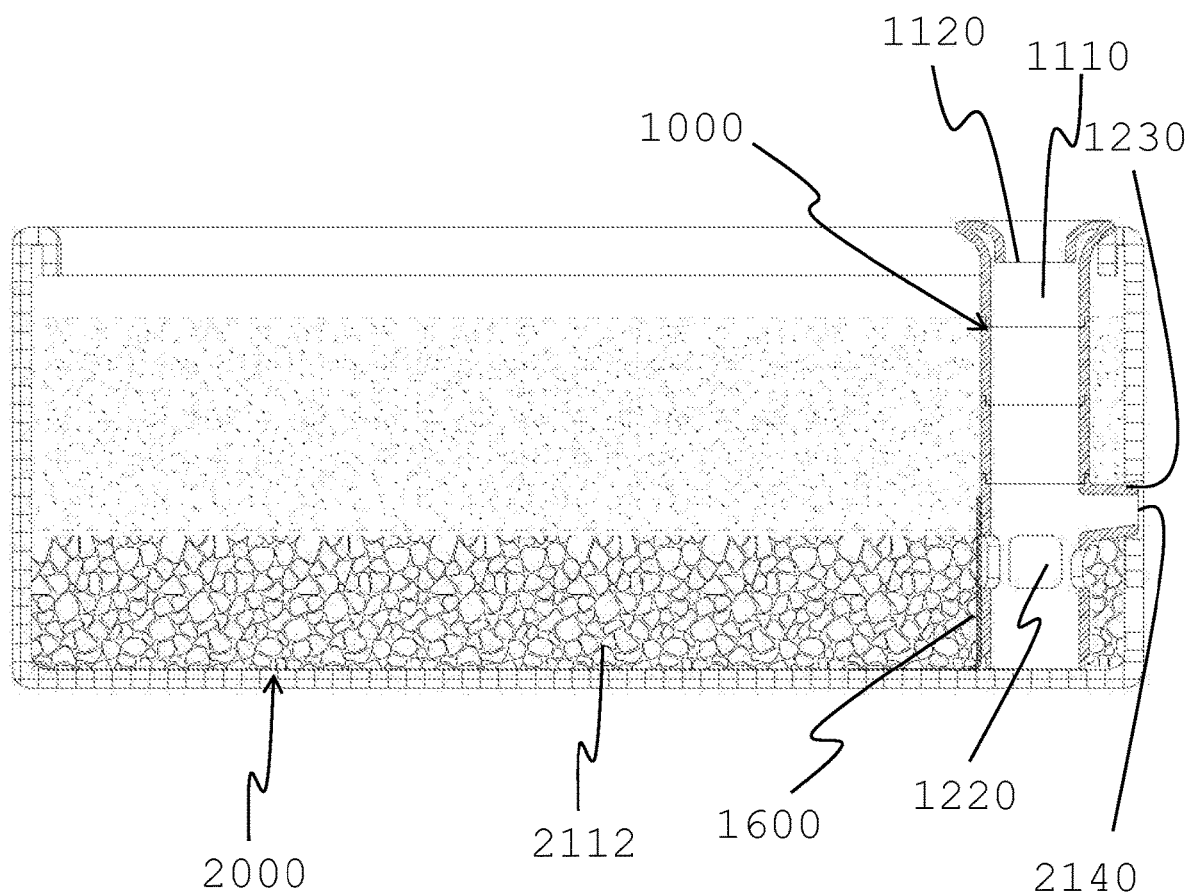
FIG. 11 shows a cross-sectional view along the plane indicated by line 11-11 of FIG. 10 of the plant pot insert received in a plant pot having a weep hole.

As shown most clearly in FIG. 9, the water filling chamber 1110 may include an upper chamber 1100 and a lower chamber 1200. The upper chamber 1100 may include the fill opening 1120 and the lower chamber 1200 may include the water outlet 1220 and the overflow spout 1230. The upper chamber 1100 and the lower chamber 1200 may be connected directly or indirectly, as shown in FIG. 9. As depicted in FIG. 11, the upper chamber 1100 and lower chamber 1200 may be connected to form the water filling chamber 1110 having the fill opening 1120, water outlet 1220, and the overflow spout 1230.

The plant pot insert 1000 may further include a riser chamber 1300 disposed between the upper chamber 1100 and the lower chamber 1200. The riser chamber 1300 may raise the height of the insert 1000. As shown in FIG. 11, the upper chamber 1110, riser chamber 1300, and the lower chamber 1200 may be connected to form the water filling chamber 1110 of the plant pot insert 1000.

As shown in the exploded view of the plant pot insert 1000 of FIG. 9, a lower part of the upper chamber 1100 and an upper part of the riser chamber 1300 may be connected by a threaded coupling 1310. Additionally, a lower part of the riser chamber 1300 and an upper part of the lower chamber 1200 may connected by a threaded coupling 1320. Other types of couplings may be used to connect the upper chamber 1100, lower chamber 1200, and the riser chamber 1300 of the water filling chamber 1110. For example, these parts may be connected by simple frictional fits.

Figure 10:
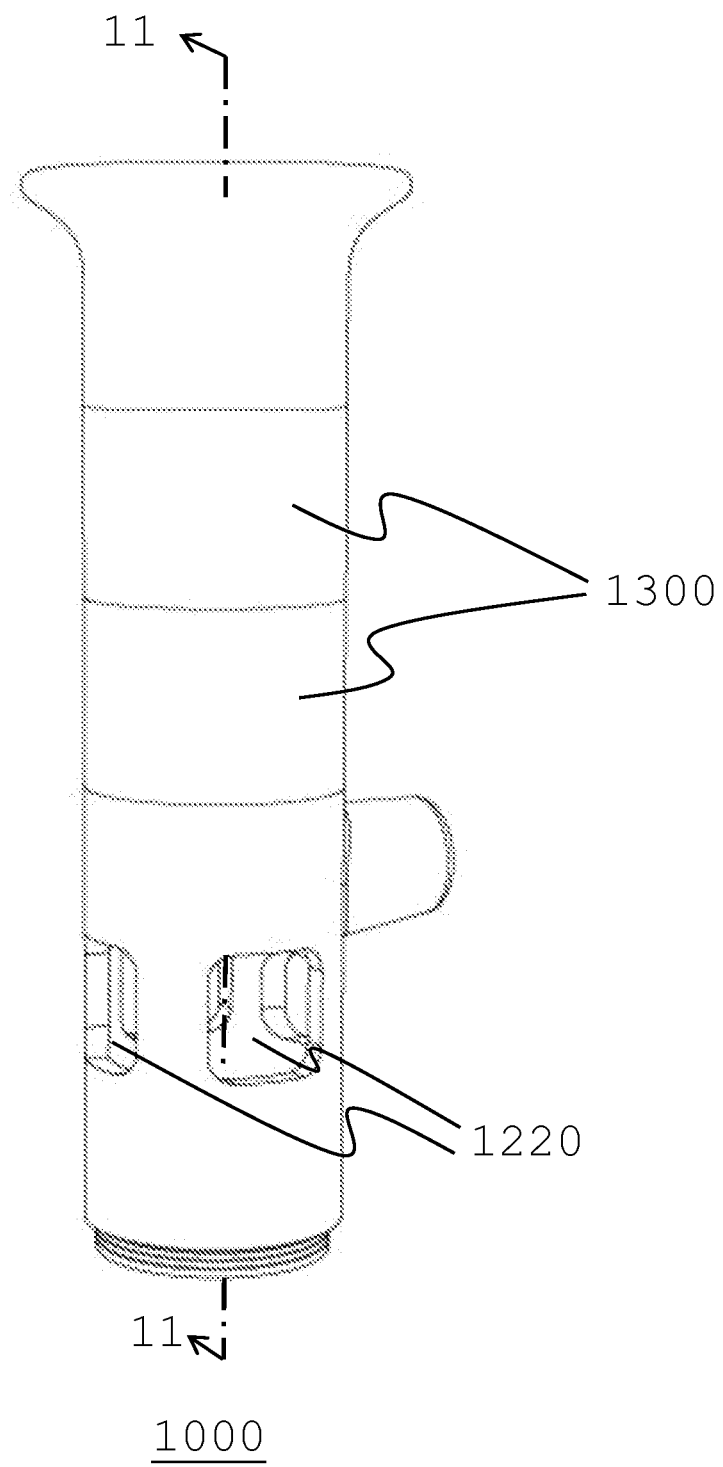
FIG. 10 shows a perspective view of a plant pot insert according to another embodiment of the present invention with the water permeable separator removed for clarity of view.

As shown in FIGS. 10 and 11, the riser chamber 1300 may include a plurality of riser chambers 1300. More than one riser chamber 1300 may be desired to further extend the height of the plant pot insert 1000. By incorporating multiple riser chambers, the plant pot insert 1000 may be adapted to be used more widely in conventional plant pots of varying heights. Additionally, the riser chamber 1300 may have a telescopic structure to adjust the height of the plant pot insert 1000.

Additionally, the plant pot insert 1000 may further include a riser chamber 1300 or a plurality of riser chambers 1300 disposed below the lower chamber 1200. The riser chamber 1300 and the lower chamber 1200 may be connected by a threaded coupling 1330 or another type of coupling. Such an embodiment may be desired when a larger water reservoir is desired. Such an embodiment may also be needed to raise the insert to allow the connection of the overflow spout 1230 to a weep hole 2140.

As shown in FIG. 11, the connection of the overflow spout 1230 to the weep hole 2140 of the plant pot 1000 may include inserting the overflow spout 1230 partially or completely through the weep hole 2140. The overflow spout 1230 may extend out of the weep hole. The connection may be include a threaded coupling between an end of the overflow spout 1230 and the weep hole 2140. The overflow spout 1230 may include an adapter to modify the thickness of the overflow spout 1230. Such an adapter may also improve a seal formed between the overflow spout 1230 and the weep hole 2140.

The overflow spout 1230 may be upwardly slanted towards the weep hole 2140. Herein, the overflow spout 1230 may be entirely upwardly slanted towards the weep hole 2140 or partially upwardly slanted toward the weep hole 2140. In the embodiment shown in FIG. 11, a bottom side of the overflow spout 1230 may be upwardly slanted towards the weep hole 2140. A water level of the water reservoir 2112 may be visually checked by looking into the overflow spout 1230 through the weep hole 2140.

The plant pot insert 1000 may be made of any strong, durable, and moldable material. Preferably, the plant pot insert 1000 may be made of fiberglass.

The water outlet 1220 may include a plurality of water outlets as shown in FIGS. 8-11.

The water permeable separator 1600 of the plant pot insert 1000 may be made of a fabric. Preferably, the water permeable separator 1600 may be made of landscape fabric. However, the water permeable separator 1600 may be some other fabric or material suitable to allow flow of water and to block passage of soil and gravel. The water permeable separator 1600 may be fixedly attached to an outer surface of a wall of the water filling chamber 1110 and act as a water permeable barrier between the water outlet 1220 and the water reservoir 2112 of the plant pot 1000.

The plant pot 1000 may be any conventional plant pot. If the plant pot 1000 does not have a weep hole 2140 on a side of the plant pot 1000, a weep hole 2140 may be formed to correspond to a vertical position of the overflow spout 1230 as in FIG. 11. As also depicted in FIG. 11, the water reservoir may include gravel, as described above. Soil, as described above, may be placed on top of the gravel.

Preferably, the plant pot insert 1000 may have a substantially cylindrical shape, but the plant pot insert 1000 may have another elongate shape.

The plant pot insert 1000 may also be provided with the water level sensing unit 190 as described above and illustrated in FIGS. 6 and 7.

Water may include water or water solutions. Water solutions may include water with plant food dissolved therein. Other nutrients helpful for the growth plants may be dissolved in the water solution.

The gravity flow of water described above relates to passive flow of water due to gravity. The plant pot and the plant pot insert are designed such that when the water reservoir of the pot is filled to capacity and has a water level above the level of the weep hole, water flow is directed by gravity flow to the overflow conduit or overflow spout to exit the plant pot through the weep hole. This feature prevents the soil of the planting space from becoming oversaturated with water. Additionally, the water being drained from the pot through the weep hole formed on a side of the plant pot may be conveniently collected; in this way, water does not drain through drainage holes formed on the bottom of plant pots, which is a common feature of conventional plant pots. As such, excess water does not pool and stain the floor or ground around the bottom of the plant pot.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A plant pot (100) for growing plants comprising:
   sidewalls (102) forming sides of the plant pot (100);
   a pot bottom (104), wherein the sidewalls (102) are formed along edges of the pot bottom (104);
   a planting space (110), wherein a lower portion of the planting space (110) comprises a water reservoir (112);
   a water filling chamber (120) having a fill opening (130) to receive water and a water outlet (135) formed below the fill opening (130);
   a water permeable separator (160) disposed between the water outlet (135) and the planting space (110) to facilitate gravity flow of water between the water filling compartment (120) and the planting space (110),
   a weep hole (140) formed in one of the sidewalls (102) of the plant pot (100);
   an overflow conduit (150) extending from the weep hole (140) to the water filling chamber (120),
   wherein water flows from the water filling chamber (120) to the planting space (110) when a water level of the water reservoir (112) is below the weep hole (140) and water flows from the water filling chamber (120) to an exterior of the plant pot (100) via the overflow conduit (150) when the water level of the water reservoir (112) is at the same level as or above the weep hole (140); and
   a light source (170) installed above the overflow conduit (150), wherein the light source (170) illuminates a water level in the overflow conduit (150) to be visible through the weep hole (140).

2. The plant pot (100) of claim 1, wherein the overflow conduit (150) is disposed above the water outlet (135).

3. The plant pot (100) of claim 1, wherein the water reservoir (112) is substantially filled with gravel (114).

4. The plant pot (100) of claim 3, wherein the gravel (114) is about 0.75 inch.

5. The plant pot (100) of claim 1, wherein the planting space (110) above the water reservoir (112) is substantially filled with soil (116).

6. The plant pot (100) of claim 5, wherein the soil (116) is sandy loam.

7. The plant pot (100) of claim 1, wherein the overflow conduit (150) is upwardly slanted towards the weep hole (140).

8. The plant pot (100) of claim 1, wherein the water permeable separator (160) is made of a landscape fabric.

9. The plant pot (100) of claim 1, wherein the sidewalls (102) are made of a material selected from the group consisting of: fiberglass, glass fiber reinforced concrete, and concrete.

10. The plant pot (100) of claim 1, further comprising a water level sensing unit to detect a water level of the water reservoir.

* * * * *